US007566118B2

(12) United States Patent
Bibl et al.

(10) Patent No.: US 7,566,118 B2
(45) Date of Patent: Jul. 28, 2009

(54) PRINT HEAD WITH THIN MEMBRANE

(75) Inventors: Andreas Bibl, Los Altos, CA (US); Zhenfang Chen, Cupertino, CA (US); Jeffrey Birkmeyer, San Jose, CA (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 536 days.

(21) Appl. No.: 10/962,378

(22) Filed: Oct. 8, 2004

(65) Prior Publication Data

US 2005/0099467 A1 May 12, 2005

Related U.S. Application Data

(60) Provisional application No. 60/510,459, filed on Oct. 10, 2003.

(51) Int. Cl.
*B41J 2/045* (2006.01)
*G11B 5/127* (2006.01)
*H02N 2/00* (2006.01)

(52) U.S. Cl. ............................ 347/68; 347/70; 216/27; 310/311

(58) Field of Classification Search .................. 347/68, 347/70–72

See application file for complete search history.

(56) References Cited

U.S. PATENT DOCUMENTS 5,259,737 A * 11/1993 Kamisuki et al. ........... 417/322
5,376,204 A 12/1994 Amano
5,831,651 A * 11/1998 Usui et al. .................... 347/70
6,164,759 A * 12/2000 Fujii et al. .................... 347/54
6,494,566 B1 * 12/2002 Kishino et al. ................ 347/70
2003/0076386 A1 4/2003 Tamahashi et al.
2003/0081073 A1 5/2003 Chen et al.
2003/0112300 A1 * 6/2003 Chung et al. .................. 347/71

FOREIGN PATENT DOCUMENTS

EP 1 321 294 A2 6/2003
EP 1 332 879 A1 8/2003
JP 2004-209724 7/2004

OTHER PUBLICATIONS

International Search Report and Written Opinion of the International Searching Authority, PCT Application Serial No. PCT/US2004/033128, Jun. 2, 2005, 16 pp.

Partial International Search Report, Mar. 1, 2005, International Application Serial No. PCT/US2004/033128, filed Oct. 7, 2004.

Brubaker, C., "[mems-talk] fixture for bonding two wafers at 1000 deg C", Dec. 17, 2001, http://mail.mems-exchange.org/pipermail/mems-talk/2001-December/005798.html.

* cited by examiner

*Primary Examiner*—Matthew Luu
*Assistant Examiner*—Lisa M Solomon
(74) *Attorney, Agent, or Firm*—Fish & Richardson P.C.

(57) ABSTRACT

A microfabricated device and method for forming a microfabricated device are described. A thin membrane including silicon is formed on a silicon body by bonding a silicon-on-insulator substrate to a silicon substrate. The handle and insulator layers of the silicon-on-insulator substrate are removed, leaving a thin membrane of silicon bonded to a silicon body such that no intervening layer of insulator material remains between the membrane and the body. A piezoelectric layer is bonded to the membrane.

15 Claims, 14 Drawing Sheets

PRINT HEAD WITH THIN MEMBRANE

CROSS-REFERENCE TO RELATED APPLICATIONS

This application claims the benefit of U.S. Provisional Application No. 60/510,459, filed on Oct. 10, 2003, which is incorporated by reference herein.

BACKGROUND

This invention relates to forming printhead modules and membranes. Ink jet printers typically include an ink path from an ink supply to a nozzle path. The nozzle path terminates in a nozzle opening from which ink drops are ejected. Ink drop ejection is controlled by pressurizing ink in the ink path with an actuator, which may be, for example, a piezoelectric deflector, a thermal bubble jet generator, or an electrostatically deflected element. A typical printhead has an array of ink paths with corresponding nozzle openings and associated actuators, and drop ejection from each nozzle opening can be independently controlled. In a drop-on-demand printhead, each actuator is fired to selectively eject a drop at a specific pixel location of an image as the printhead and a printing substrate are moved relative to one another. In high performance printheads, the nozzle openings typically have a diameter of 50 microns or less, e.g. around 25 microns, are separated at a pitch of 100-300 nozzles/inch, have a resolution of 100 to 3000 dpi or more, and provide drop sizes of about 1 to 70 picoliters (pl) or less. Drop ejection frequency is typically 10 kHz or more.

Hoisington et al. U.S. Pat. No. 5,265,315, the entire contents of which is hereby incorporated by reference, describes a printhead that has a semiconductor printhead body and a piezoelectric actuator. The printhead body is made of silicon, which is etched to define ink chambers. Nozzle openings are defined by a separate nozzle plate, which is attached to the silicon body. The piezoelectric actuator has a layer of piezoelectric material, which changes geometry, or bends, in response to an applied voltage. The bending of the piezoelectric layer pressurizes ink in a pumping chamber located along the ink path.

The amount of bending that a piezoelectric material exhibits for a given voltage is inversely proportional to the thickness of the material. As a result, as the thickness of the piezoelectric layer increases, the voltage requirement increases. To limit the voltage requirement for a given drop size, the deflecting wall area of the piezoelectric material may be increased. The large piezoelectric wall area may also require a correspondingly large pumping chamber, which can complicate design aspects such as maintenance of small orifice spacing for high-resolution printing.

Printing accuracy is influenced by a number of factors, including the size, velocity and uniformity of drops ejected by the nozzles in the head and among multiple heads in a printer. The drop size and drop velocity uniformity are in turn influenced by factors such as the dimensional uniformity of the ink paths, acoustic interference effects, contamination in the ink flow paths, and the actuation uniformity of the actuators.

SUMMARY

In general, in one aspect, the invention features a method of forming a microfabricated device. The method includes etching an upper surface of a substrate to form at least one etched feature. A multilayer substrate is bonded to the upper surface of the substrate so that the etched feature on the upper surface is covered to form a chamber. The multilayer substrate includes a silicon layer and a handle layer. The bonding forms a silicon-to-silicon bond between the upper surface of the substrate and the silicon layer. The handle layer is removed from the multilayer substrate to form a membrane including the silicon layer over the chamber.

Implementations of the invention can include one or more of the following features. The multilayer substrate can be a silicon-on-insulator substrate. The multilayer substrate can include an oxide layer. The oxide layer can be removed to form the membrane, such as by etching. A conductive layer can be formed on the membrane. A piezoelectric layer can be bonded to the membrane. The multilayer substrate can be bonded the substrate by fusion bonding a silicon layer of the multilayer substrate to silicon of the upper surface of the substrate. Oxide can be removed from any silicon layers with a hydrofluoric etch prior to the fusion bond. The handle layer can be removed from the multilayer substrate, such as by etching or grinding. The handle layer can be formed from silicon. The membrane can be less than 15, 10, 5 or 1 microns thick. A metal mask can be formed on the substrate. The metal can include nickel and chromium. A metal stop layer can be formed on the bottom surface of the substrate prior to etching. The metal layer can include one of nickel, chromium, aluminum, copper, tungsten or iron.

In another aspect, the invention features a method of forming a printhead. The method includes etching an upper surface of a substrate to have at least one etched feature. A multilayer substrate is bonded to the upper surface of the substrate so that the etched feature on the upper surface is covered to form a chamber. The multilayer substrate includes a first layer and a handle layer. The handle layer is removed from the multilayer substrate to form a membrane. A piezoelectric layer is bonded to the membrane.

Implementations of the invention can include one or more of the following features. A nozzle layer can be bonded to a lower surface of the substrate, wherein the nozzle layer includes at least a portion of one or more nozzles for ejecting a fluid. The upper surface of the substrate can be etched to form at least a portion of an ink flow path.

In yet another aspect, the invention features a method of forming a microfabricated device. A metal layer is formed on a bottom surface of a first substrate. The first substrate is etched from a top surface of the substrate such that etched features extend through the first substrate to the metal layer. The metal layer is removed from the bottom surface of the first substrate after etching the first substrate. A layer is joined to the bottom surface of the first substrate.

Implementations of the invention can include one or more of the following features. Etching the first substrate can include deep reactive ion etching the first substrate. Joining a layer to the bottom surface of the substrate can include joining a first silicon surface to a second silicon surface. Features can be etched into the bottom surface of the first substrate. A multilayer substrate can be bonded to the upper surface of the substrate so that the etched features on the upper surface are covered to form one or more chambers, the multilayer substrate including a first layer and a handle layer and the handle layer can be removed from the multilayer substrate to form a membrane covering the one or more chambers.

In yet another aspect, the invention features a method of forming a microfabricated device. One or more recesses are etched into a bottom surface of a first substrate. A sacrificial layer is formed on the bottom surface of the first substrate after etching the bottom surface. The first substrate is etched from a top surface of the substrate such that etched features extend through the first silicon substrate to the sacrificial layer. The sacrificial layer is removed from the bottom surface of the first substrate.

In another aspect, the invention features a method of forming a printhead. A first substrate is etched from a top surface of the first substrate such that etched features extend through the first substrate to a layer on a bottom surface of the first substrate. A layer is joined to the bottom surface of the first substrate after etching the first substrate from the top surface. After joining the layer to the bottom surface, nozzle features are formed in the layer so that the nozzle features connect to the etched features.

In one aspect, the invention features a microfabricated device. The device includes a body, a membrane and a piezoelectric structure. The body is of a first material, and has a plurality of recesses. The membrane is of the first material and is less than 15 microns thick. The membrane is bonded to the body such that the recesses in the body are at least partially covered by the membrane and an interface between the membrane and body is substantially free from a material other than the first material. The piezoelectric structure is formed on the membrane, where the piezoelectric structure includes a first conductive layer and a piezoelectric material.

The device can include recesses that provide one or more paths, each path having an inlet and an outlet to communicate with an exterior of the body. The paths can include regions of varying depth. The outlet of each path can be a nozzle. The nozzle can be on an opposite side of the body from the membrane. The membrane can vary in thickness by less than 1 micron. The first material can be silicon. The membrane can be substantially free of openings. The recesses can include a pumping chamber adjacent to the membrane. The membrane can be less than 10, 5 or 1 microns thick. The membrane can include a second material, such as an oxide. The piezoelectric structure can include a second conductive layer. The piezoelectric material can be between the first and second conductive layers.

Potential advantages of the invention may include none, one or more of the following. The etched features in the module substrate, such as, nozzles, filters and ink supplies, can be formed using a metal etch stop. Forming a metal etch stop on a silicon substrate to fabricate the print head etched features can reduce charge accumulation during etching. The non-accumulation of charge can reduce undercut that would otherwise occur when an oxide layer in a silicon-on-insulator substrate is used as the etch stop layer. The etch process can also generate intense heat to build, leading to defects in the substrate. However, using a metal etch stop can provide improved heat dissipation because metal has a higher thermal conductivity than oxide. At the end of the etch process when the silicon substrate is etched through, the metal layer can stop the leakage of cooling agents from the opposite side of the substrate. A metal can also be used as an etch mask, obviating the need for multiple repetitions of applying a photoresist, patterning the photoresist and etching the substrate.

An actuator, including an actuator membrane, is generally formed or bonded on the top of the module substrate. A silicon substrate can be bonded onto the module substrate and then ground to the desired thickness to form the actuator membrane. Alternatively, the actuator membrane can be formed by bonding a silicon-on-insulator substrate onto the module substrate. Bonding a silicon-on-insulator substrate having a device layer of silicon of a desired thickness onto the module substrate can allow for formation of a thinner membrane than by traditional grinding techniques. The silicon layer of a silicon-on-insulator substrate can be very uniform within each substrate, thus an actuator membrane of a printhead formed with a silicon-on-insulator substrate also can be very uniform. A thinner membrane is advantageous because it may need less voltage to create the same ink drop size than a thicker membrane. The deflecting wall area of the piezoelectric actuator and the pumping chamber size can also be decreased when a thinner membrane is formed. Smaller orifice spacing is possible, which allows for manufacturing higher resolution printers. The thickness uniformity of membranes across the print heads can be improved when grinding the membrane is replaced by bonding a silicon-on-insulator substrate to the module substrate.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 shows a perspective view of a printhead, while

FIG. 4A shows a cross-sectional assembly view through a flow path in a printhead module, while

Like reference symbols in the various drawings indicate like elements.

DETAILED DESCRIPTION

Print Head Structure

Figure 1:
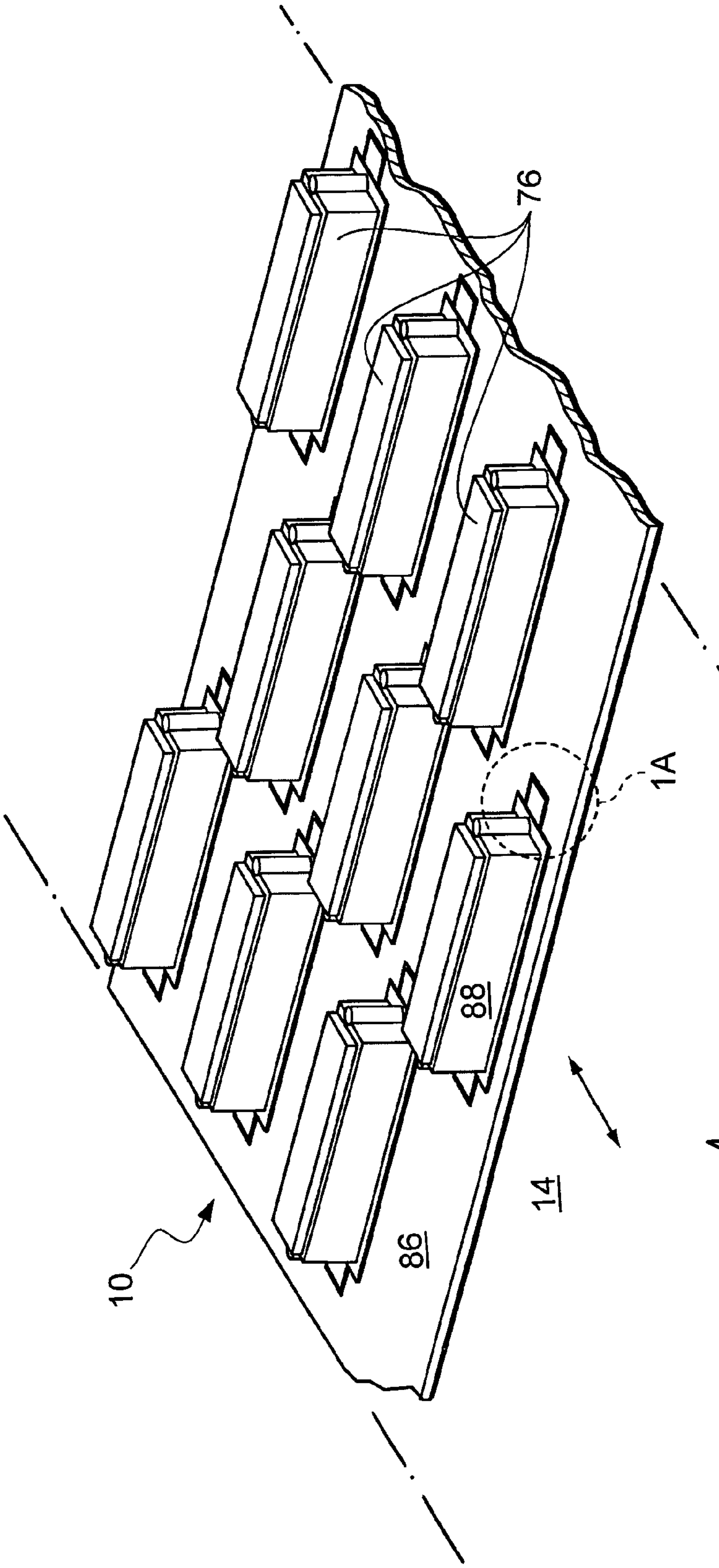

Referring to FIG. 1, an ink jet printhead 10 includes printhead units 76 which are held on a frame 86 in a manner that they span a sheet 14, or a portion of the sheet, onto which an image is printed. The image can be printed by selectively jetting ink from the units 76 as the printhead 10 and the sheet 14 move relative to one another (in the direction of the arrow). In the embodiment in FIG. 1, three sets of printhead units 76 are illustrated across a width of, e.g., about 12 inches or more. Each set includes multiple printhead units, for example, three along the direction of relative motion between the printhead and the sheet. The units can be arranged to offset nozzle openings to increase resolution and/or printing speed. Alternatively, or in addition, each unit in each set can be supplied ink of a different type or color. This arrangement can be used for color printing over the full width of the sheet in a single pass of the sheet by the printhead.

Figure 1A:
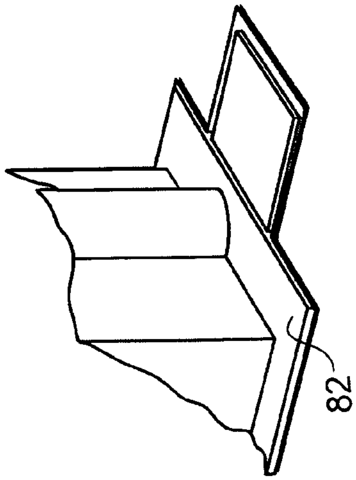
FIG. 1A is an enlarged view of the area A in FIG. 1.
Figure 2A:
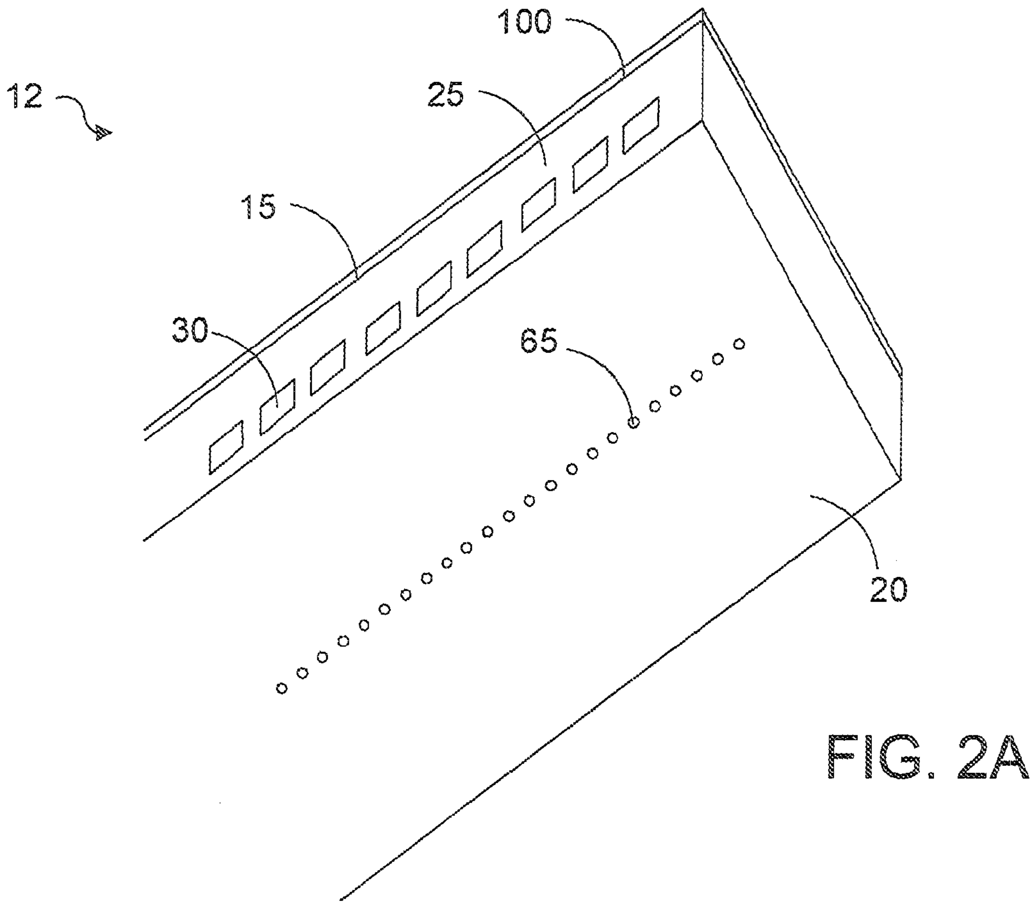
FIGS. 2A, 2B and 2C show perspective views of a printhead module.
Figure 2C:
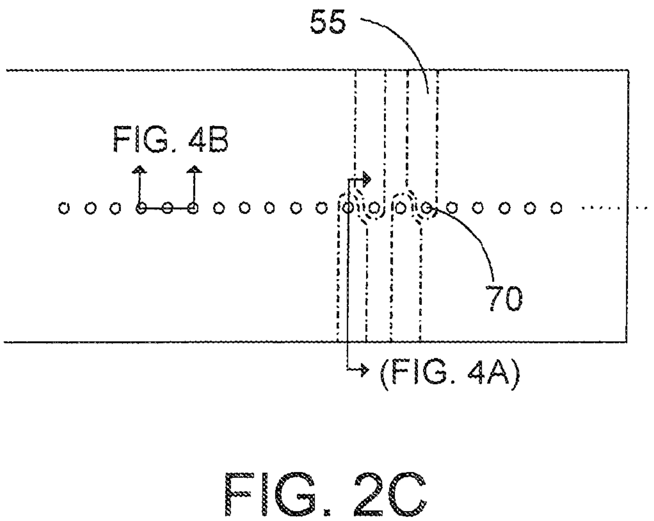
Figure 2B:
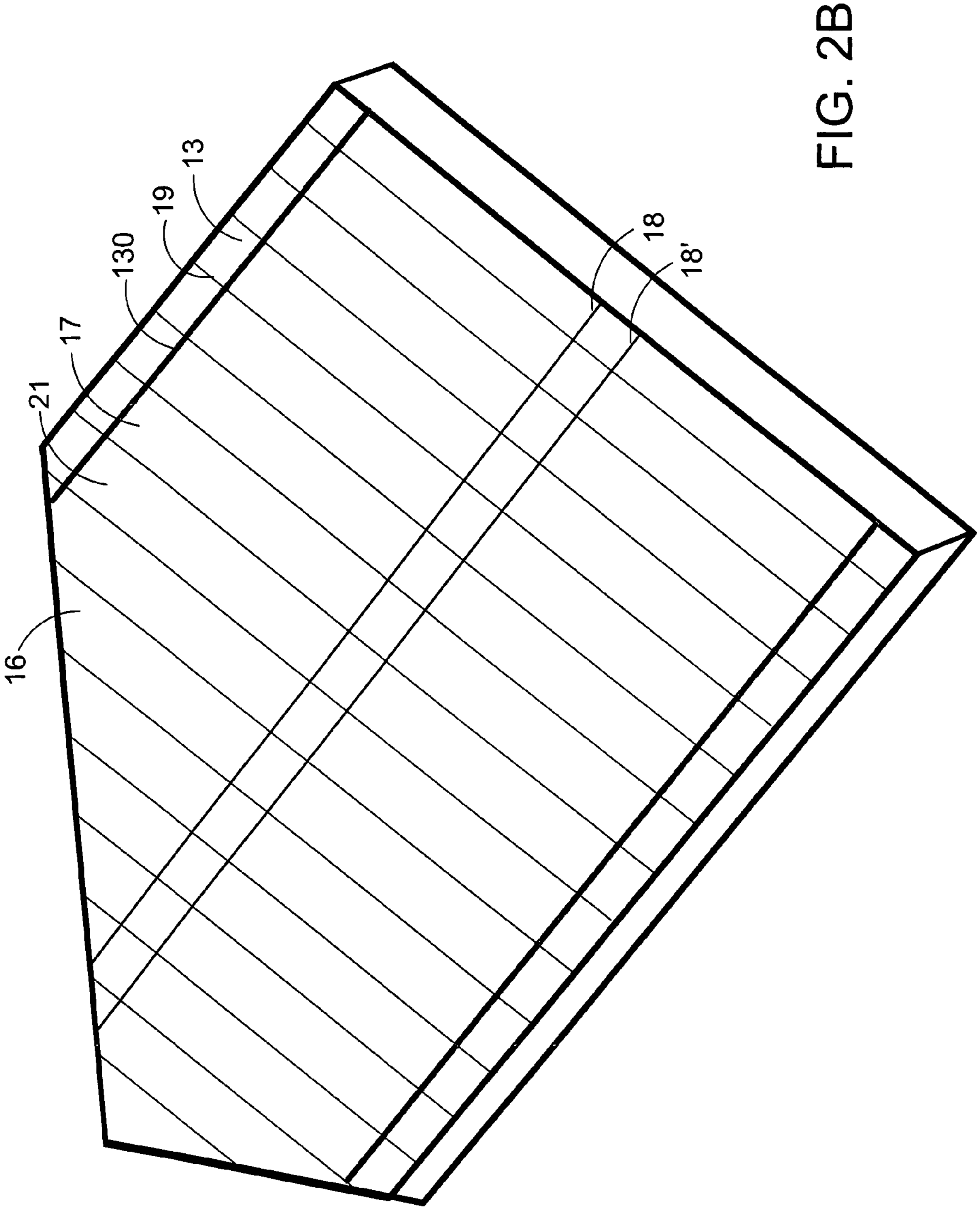
Figure 3:
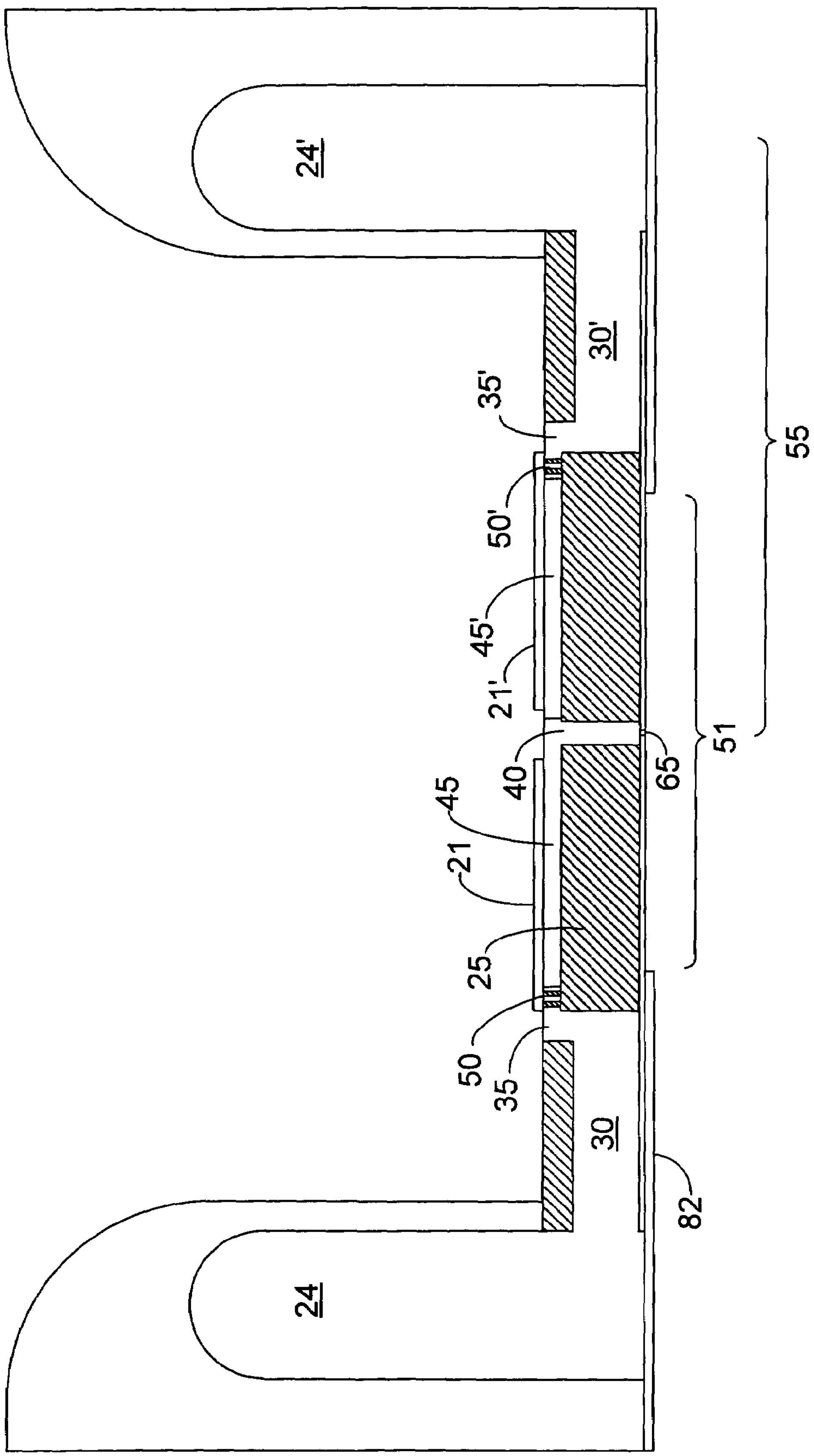
FIG. 3 shows a cross-sectional view of one embodiment of a printhead unit.

Referring to FIGS. 2A, 2B and 3, each printhead unit 76 includes a printhead module 12 that can controllably eject droplets of ink. The printhead module 12 is positioned on a faceplate 82 (see FIG. 1A) so that the nozzles 65 of the module 12 are exposed through an aperture 51 (see FIG. 3) in the face plate 82. A flex circuit (not shown) is secured to the back surface of the module for delivering drive signals that control ink ejection. Referring particularly to FIGS. 1 and 3, the faceplate 82 and module 12 are enclosed in a housing 88 and are attached to a manifold assembly that includes ink supply paths for delivering ink to the module 12.

Returning to FIG. 2A, the module 12 is a generally rectangular solid. In one implementation, the module 12 is between about 30 and 70 mm long, 4 and 12 mm wide and 400 to 1000 microns thick. The dimensions of the module can be varied, e.g., within a semiconductor substrate in which the flow paths are etched, as will be discussed below. For example, the width and length of the module may be 10 cm or more.

The module 12 includes a module substrate 25 and piezoelectric actuator structure 100. A front surface 20 of the module substrate includes an array of nozzles 65 from which ink drops are ejected, and a back surface 15 of the substrate 25 is secured to the piezoelectric actuator structure 100.

Figure 4A:
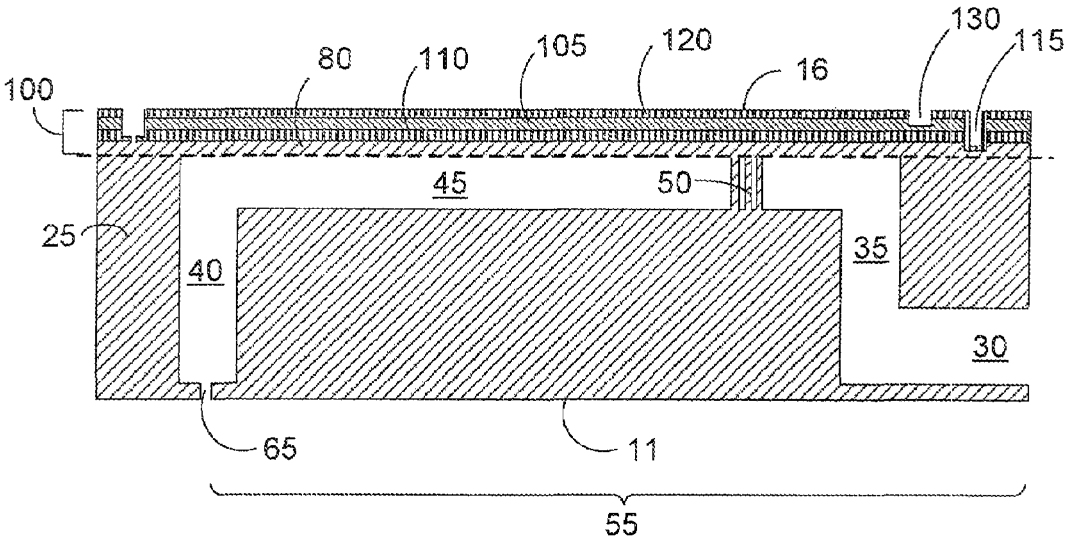

Referring to FIGS. 2A, 2C and 4A, the substrate includes multiple flow paths 55 to carry the ink from inlets 30 to nozzles. Specifically, as best shown in FIG. 4A, each flow path is a passage through the module substrate 25 defined by an ink inlet 30, an ascender 35, an impedance filter feature 50 a pumping chamber 45 and a descender 40. Ink flows along the flow path 55 (see FIG. 4A) from the manifold assembly to the nozzle 65.

Referring to FIG. 2B, each module 12 has on its back portion 16 a series of drive contacts 17 to which the flex print is attached. Each drive contact corresponds to a single actuator 21, and each actuator 21 is associated with an ink path 55 so that ejection of ink from each nozzle opening is separately controllable. In the embodiment illustrated, the module has a single row of nozzle openings. However, modules can be provided with multiple rows of nozzle openings. For example, the openings in one row may be offset relative to another row to increase resolution. Alternatively or in addition, the flow paths 55 corresponding to the nozzles in different rows may be provided with inks of different colors or types (e.g., hot melt, UV curable, aqueous-based). Referring to FIG. 2C, the relationship of the nozzles 65 to the ink flow paths 55 is shown (individual ink paths are shown in phantom).

Module Substrate

Figure 4B:
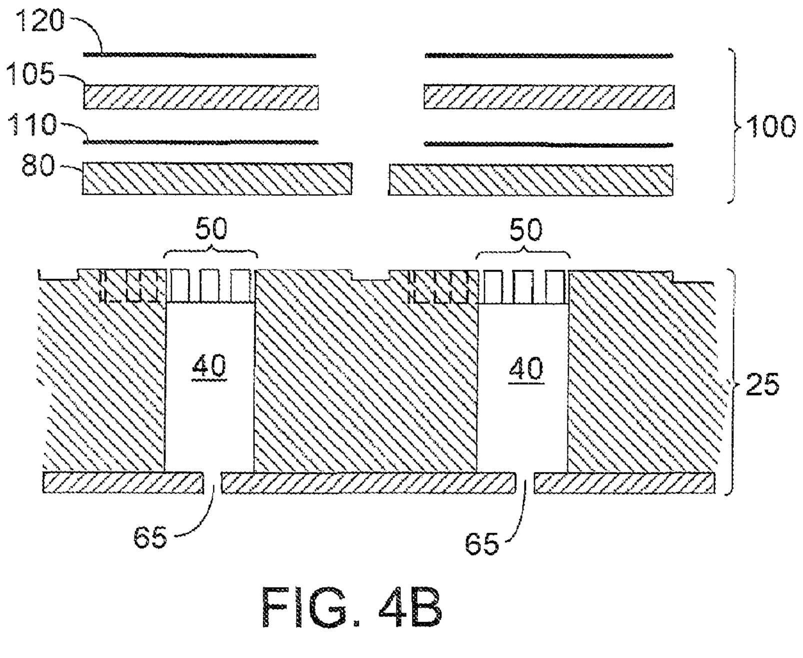
FIG. 4B is a cross-sectional assembly view of a module along line BB in FIG. 4A.

Referring particularly to FIGS. 3, 4A and 4B, the module substrate 25 is a monolithic semiconductor body such as a silicon substrate. Passages through the silicon substrate define a flow path for ink through the substrate. The module substrate can be formed from silicon.

The module 12 can include flow paths on either side of the module centerline. In one embodiment, shown in FIG. 3, passages through the substrate 25 define ink inlets 30, 30', impedance filter features 50, 50', pumping chambers 45, 45' and nozzle 65. The actuators 21, 21' are positioned over the pumping chambers 45, 45'. Thus, the pumping chambers 45, 45' that supply adjacent nozzles are on alternate sides of the centerline of the module substrate. The pumping chambers 45, 45' are located closer to a back surface 15 of the substrate and the nozzle 65 is formed in a front surface 11 of the substrate. Ink is supplied from a manifold flow path 24, enters the inlet 30, flows up ascender 35 and is directed to the impedance filter feature 50. Ink flows through the impedance filter feature 50 to the pumping chamber 45, where the ink is pressurized by the actuator 21 such that it is directed to the descender 40 and out of the nozzle opening 65. The etched features can be configured in a variety of ways.

The thickness uniformity of the monolithic body, and among monolithic bodies of multiple modules in a printhead, is high. For example, thickness uniformity of the monolithic bodies, can be, for example, about +1 micron or less for a monolithic body formed across a 6 inch polished silicon substrate. As a result, dimensional uniformity of the flow path features etched into the substrate is not substantially degraded by thickness variations in the body. Moreover, the nozzle openings are defined in the module body without a separate nozzle plate. In a particular embodiment, the thickness of the nozzle opening is about 1 to 200 microns, e.g., about 30 to 50 microns. In one implementation, the nozzle openings have a pitch of about 140 microns. The pumping chambers have a length of about 1 to 5 mm, e.g., about 1 to 2 mm, a width of about 0.1 to 1 mm, e.g., about 0.1 to 0.5 mm and a depth of about 60 to 100 microns. In a particular embodiment, the pumping chamber has a length of about 1.8 mm, a width of about 0.21 mm, and a depth of about 65 microns.

Figure 5:
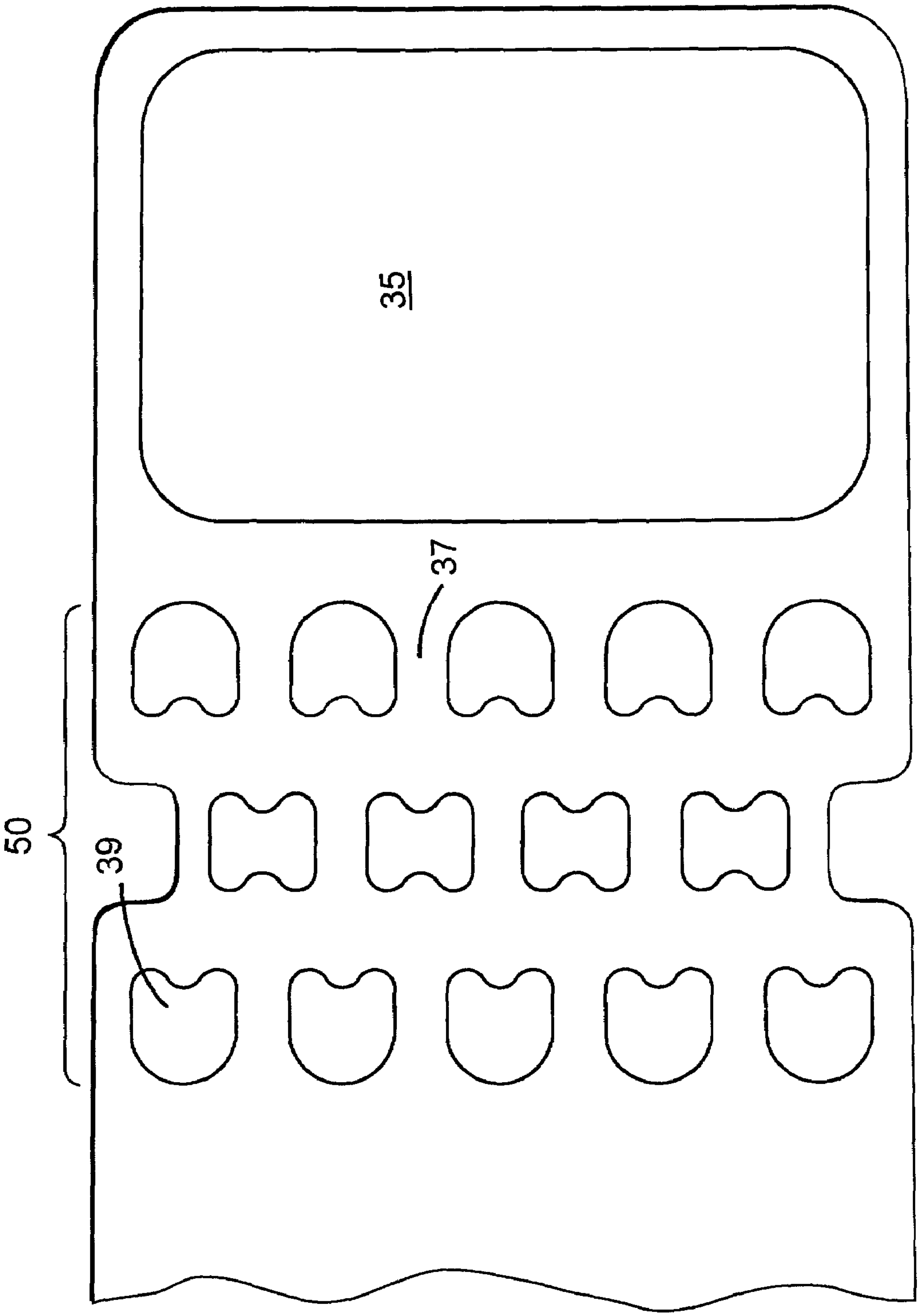
FIG. 5 shows a top view of the impedance filter feature.

Referring to FIGS. 4A, 4B and 5, the module substrate 25 includes an impedance filter feature 50 located upstream of the pumping chamber 45. The impedance filter feature 50 is defined by a series of projections 39 in the flow path. The impedance filter feature 50 can be constructed to provide filtering only, acoustic impedance control only, or both filtering and acoustic impedance control. The location, size, spacing, and shape of the projections are selected to provide filtering and/or a desired acoustic impedance. As a filter, the feature traps debris such as particulates or fibers so that they do not reach and obstruct the nozzle. As an acoustic impedance element, the feature absorbs pressure waves propagating from the pumping chamber 45 toward the inlet 30, thus reducing acoustic crosstalk among chambers in the module and increasing operating frequency.

The number of flow openings 37 in the impedance filter feature 50 can be selected so that a sufficient flow of ink is available to the pumping chamber for continuous high frequency operation. For example, a single flow opening 37 of small dimension sufficient to provide dampening could limit ink supply. To avoid this ink starvation, a number of openings can be provided. The number of openings can be selected so that the overall flow resistance of the feature is less than the flow resistance of the nozzle. In addition, to provide filtering, the diameter or smallest cross sectional dimension of the flow openings can be less than the diameter (the smallest cross-section) of the corresponding nozzle opening, for example 60% or less of the nozzle opening. One embodiment of a filtering impedance feature 50, the cross section of the 37 openings is about 60% or less than the nozzle opening cross section and the cross sectional area for all of the flow openings in the feature is greater than the cross sectional area of the nozzle openings, for example about 2 or 3 times the nozzle cross sectional area or more, e.g. about 10 times or more. For an impedance filter feature in which flow openings have varying diameters, the cross sectional area of a flow opening is measured at the location of its smallest cross sectional dimension. In the case of an impedance filter feature 50 that has interconnecting flow paths along the direction of ink flow, the cross-sectional dimension and area are measured at the region of smallest cross-section. In some embodiments, pressure drop can be used to determine flow resistance through the feature. The pressure drop can be measured at jetting flow. Jetting flow is the drop volume/fire pulse width. In some embodiments, at jetting flow, the pressure drop across the impedance/filter feature is less than the pressure drop across the nozzle flow path. For example, the pressure drop across the feature is about 0.5 to 0.1 of the pressure drop across the nozzle flow path.

In one implementation, the impedance filter feature 50 can have three rows of projections. In this implementation, projections 39 have a diameter of about 25 to 30 microns where in each row the projections 39 are separated by about 15 to 20 microns and each row of projections are separated by about 5 to 20 microns. The impedance filter feature 50 can be selected to substantially reduce acoustic reflection into the ink supply path. For example, the impedance of the feature 50 may substantially match the impedance of the pumping chamber 45. Alternatively, it may be desirable to provide impedance greater than the chamber to enhance the filtering function or to provide impedance less than the chamber to enhance ink flow. In the latter case, crosstalk may be reduced by utilizing a compliant membrane or additional impedance control features elsewhere in the flow path. The impedance of the pumping chamber 45 and the impedance filter feature 50 can be modeled using fluid dynamic software, such as Flow 3D, available from Flow Science Inc., Santa Fe, N. Mex.

The nozzle 65 illustrated in FIG. 4A is a generally cylindrical path of constant diameter corresponding to the orifice diameter. This region of small, substantially constant diameter upstream of the nozzle opening enhances printing accuracy by promoting drop trajectory straightness with respect to the axis of the nozzle opening. In addition, the nozzle 65 improves drop stability at high frequency operation by discouraging the ingestion of air through the nozzle opening. This is a particular advantage in printheads that operate in a fill-before-fire mode, in which the actuator generates a negative pressure to draw ink into the pumping chamber before firing. The negative pressure can also cause the ink meniscus in the nozzle to be drawn inward from the nozzle opening. By providing a nozzle 65 thicker than the maximum meniscus withdrawal, the ingestion of air is discouraged. Alternatively, the nozzle 65 can have either a constant or a variable diameter. For example, the nozzle 65 may have a funnel or conical shape extending from a larger diameter near the descender to a smaller diameter near the nozzle opening. The cone angle may be, for example, 5 to 30°. The nozzle 65 can also include a curvilinear quadratic, or bell-mouth shape, from larger to smaller diameter. The nozzle 65 can also include multiple cylindrical regions of progressively smaller diameter toward the nozzle opening. The progressive decrease in diameter toward the nozzle opening reduces the pressure drop across the accelerator region 68, which reduces drive voltage, and increases drop size range and fire rate capability. The lengths of the portions of the nozzle flow path having different diameters can be accurately defined.

In particular embodiments, the ratio of the thickness of the nozzle 65 to the diameter of the nozzle opening is typically about 0.5 or greater, e.g., about 1 to 4, or about 1 to 2. The nozzle 65 has a maximum cross-section of about 50 to 300 microns and a length of about 400-800 microns. The nozzle opening and the nozzle 65 have a diameter of about 5 to 80 microns, e.g. about 10 to 50 microns. The nozzle 65 has a length of about 1 to 200 microns, e.g., about 20 to 50 microns. The uniformity of the nozzle 65 length may be, for example, about +3% or less or +2 microns or less, among the nozzles of the module body. For a flow path arranged for a 10 pl drop, the descender has a length of about 550 microns. The descender leading to the nozzle 65 has a racetrack, ovaloid shape with a minor width of about 85 microns and a major width of about 160 microns. The nozzle 65 has a length of about 30 microns and a diameter of about 23 microns.

Actuator

Referring to FIGS. 4A and 4B, the piezoelectric actuator structure 100 from which the individual actuators 21 are formed includes an actuator membrane 80 (which can also be considered part of the substrate 25), a ground electrode layer 110, a piezoelectric layer 105, and a drive electrode layer 120. The piezoelectric layer 105 is a thin film of piezoelectric material having a thickness of about 50 microns or less, e.g. about 25 microns to 1 micron, or about 8 to about 18 microns. The piezoelectric layer 105 can be composed of a piezoelectric material that has desirable properties such as high density, low voids, and high piezoelectric constants. The actuator membrane can be formed from silicon.

The actuator electrode layers 110 and 120 can be metal, such as copper, gold, tungsten, indium-tin-oxide (ITO), titanium, platinum, or a combination of metals. The thickness of the electrode layers may be, for example, about 2 microns or less, e.g. about 0.5 microns. In particular embodiments, ITO is used to reduce shorting. The ITO material can fill small voids and passageways in the piezoelectric material and has sufficient resistance to reduce shorting. ITO is advantageous for thin piezoelectric layers driven at relatively high voltages.

The piezoelectric layer 105 with the ground electrode layer 110 on one side is fixed to the actuator membrane 80. The actuator membrane 80 isolates the ground electrode layer 110 and the piezoelectric layer 105 from ink in the chamber 45. The actuator membrane 80 can be silicon and has a compliance selected so that actuation of the piezoelectric layer causes a flexure of the actuator membrane 80 that is sufficient to pressurize ink in the pumping chamber 45. The thickness uniformity of the actuator membrane provides accurate and uniform actuation across the module.

In one embodiment, the piezoelectric layer 105 is attached to the actuator membrane 80 by a bonding layer. In other embodiments, the actuator does not include a membrane between the piezoelectric layer and the pumping chamber. The piezoelectric layer may be directly exposed to the ink chamber. In this case, both the drive and ground electrodes can be placed on the opposite, back side of the piezoelectric layer and not exposed to the ink chamber.

Referring back to FIG. 2B, as well as FIGS. 4A and 4B, the actuators on either side of the centerline of the module are separated by cut lines 18, 18' that have a depth extending to the actuator membrane 80. Adjacent actuators are separated by isolation cuts 19. The isolation cuts extend (e.g., 1 micron deep, about 10 microns wide) into the silicon body substrate (FIG. 4B). The isolation cuts 19 mechanically isolate adjacent chambers to reduce crosstalk. If desired, the cuts can extend deeper into the silicon, e.g. to the depth of the pumping chambers. The back portion 16 of the actuator also includes ground contacts 13, which are separated from the actuators and drive contacts 17 by separation cuts 130 extending into the piezoelectric layer leaving the ground electrode layer 110 intact (FIG. 4A). A ground plane cut 115 made before the top surface is metalized exposes the ground electrode layer 110 at the edge of the module so that the top surface metallization connects the ground contacts to the ground electrode layer 110.

Manufacture

Figure 6A:
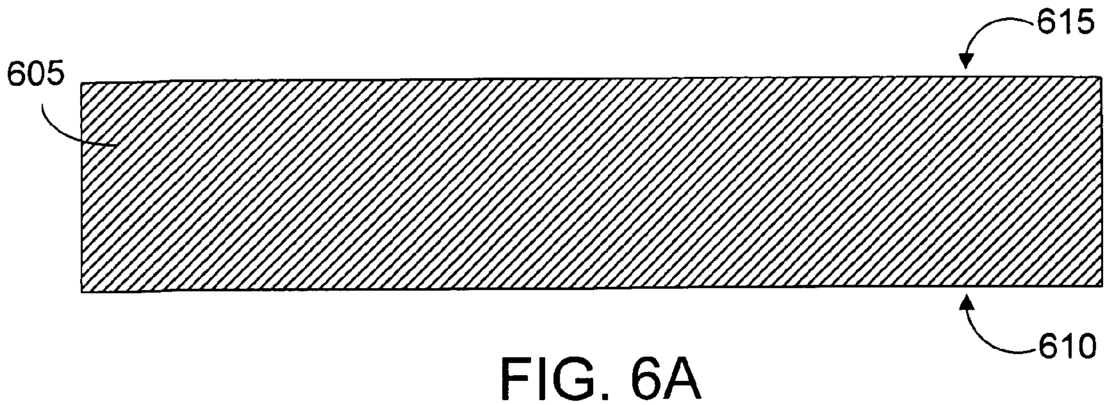
FIGS. 6A to 6P show cross-sectional views illustrating manufacture of a printhead module body.
Figure 6B:
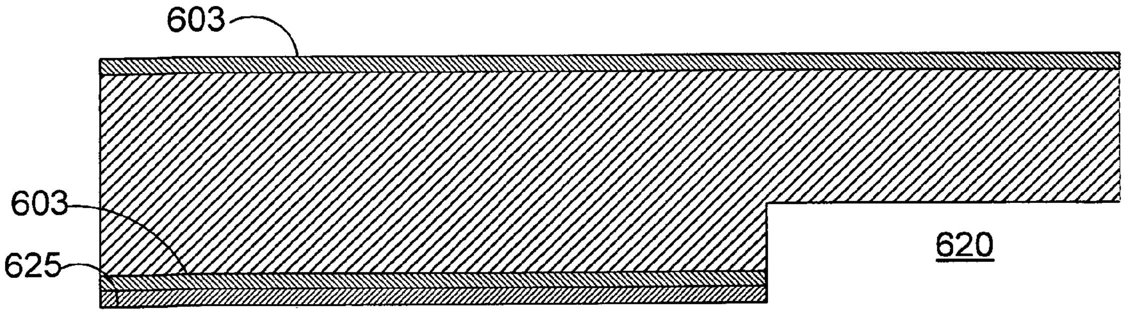
Figure 6C:
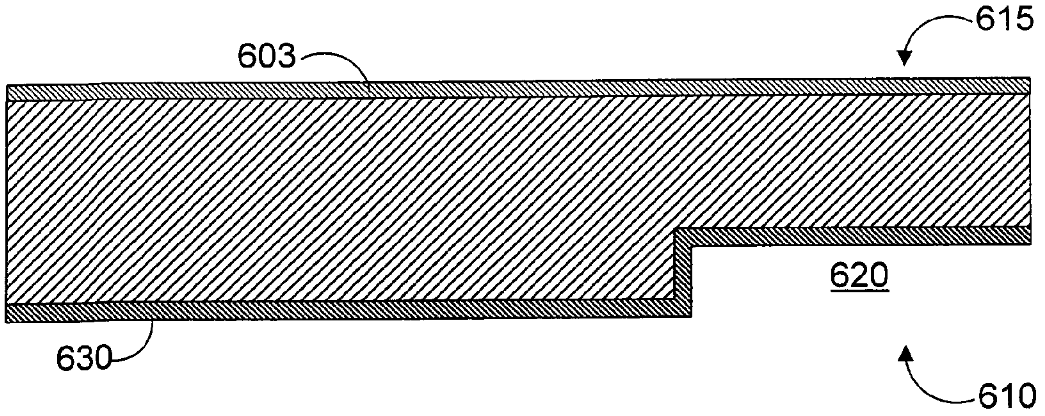
Figure 6D:
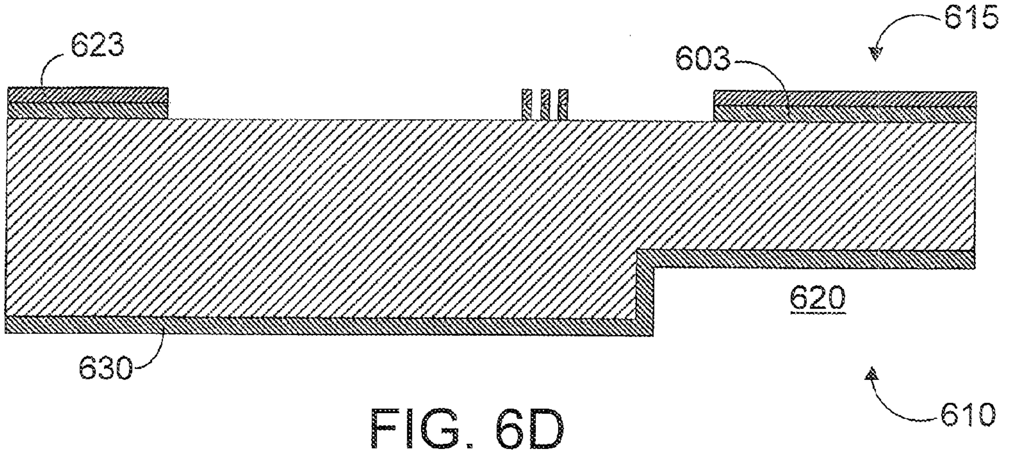
Figure 6E:
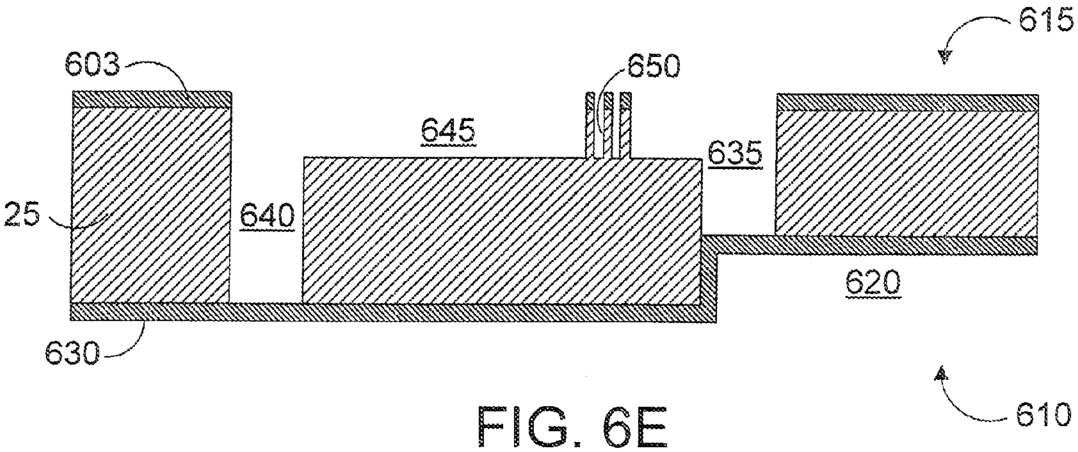
Figure 6F:
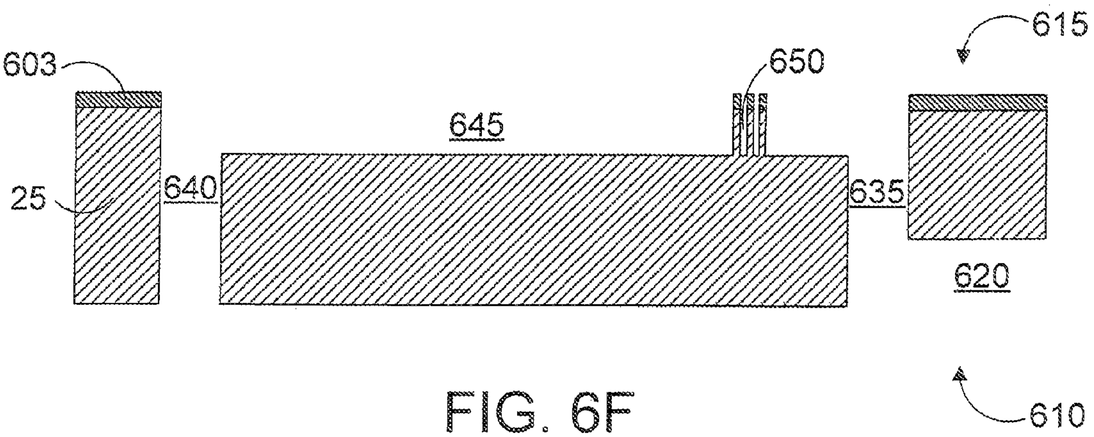
Figure 6G:
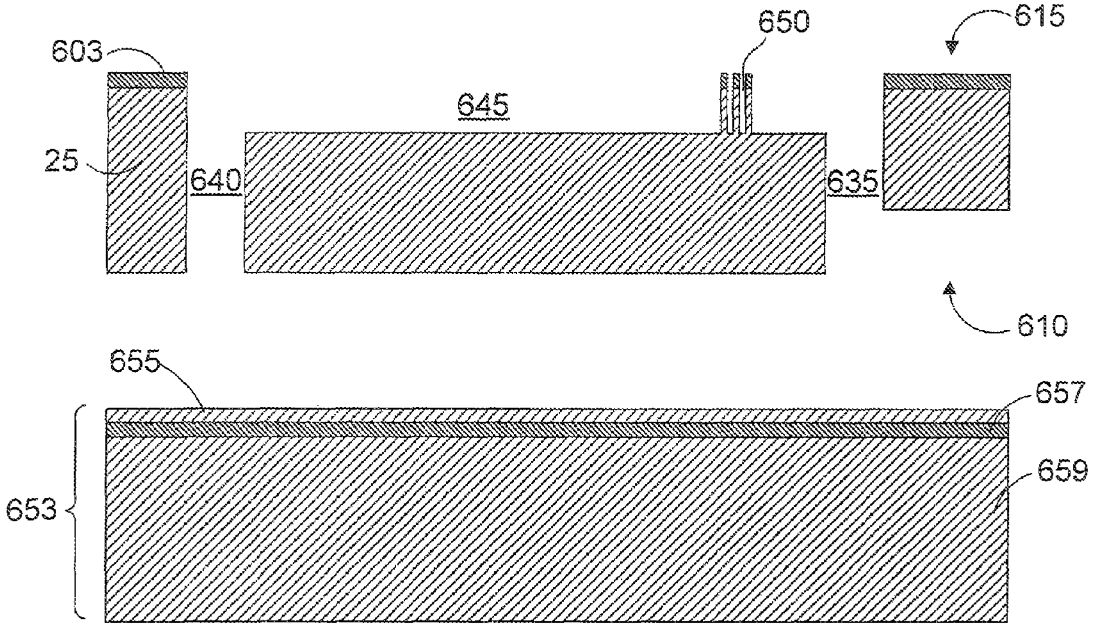
Figure 6H:
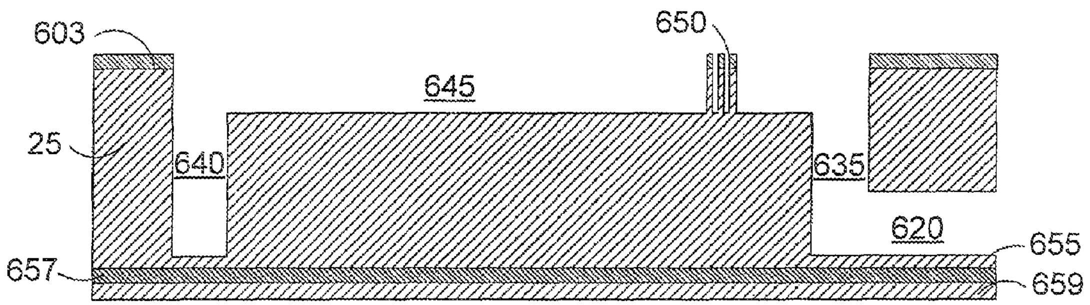
Figure 6I:
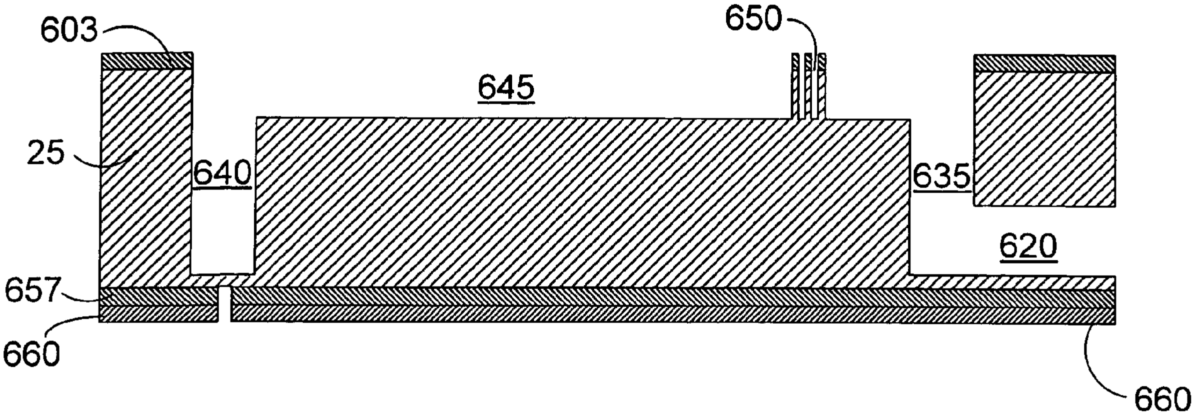
Figure 6J:
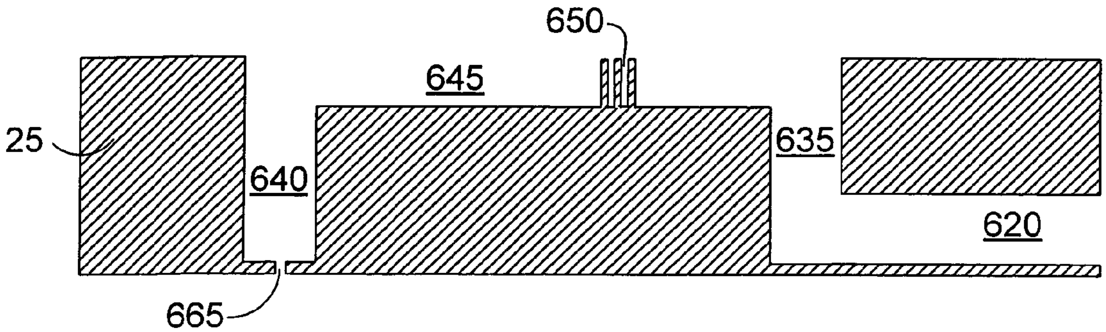
Figure 6K:
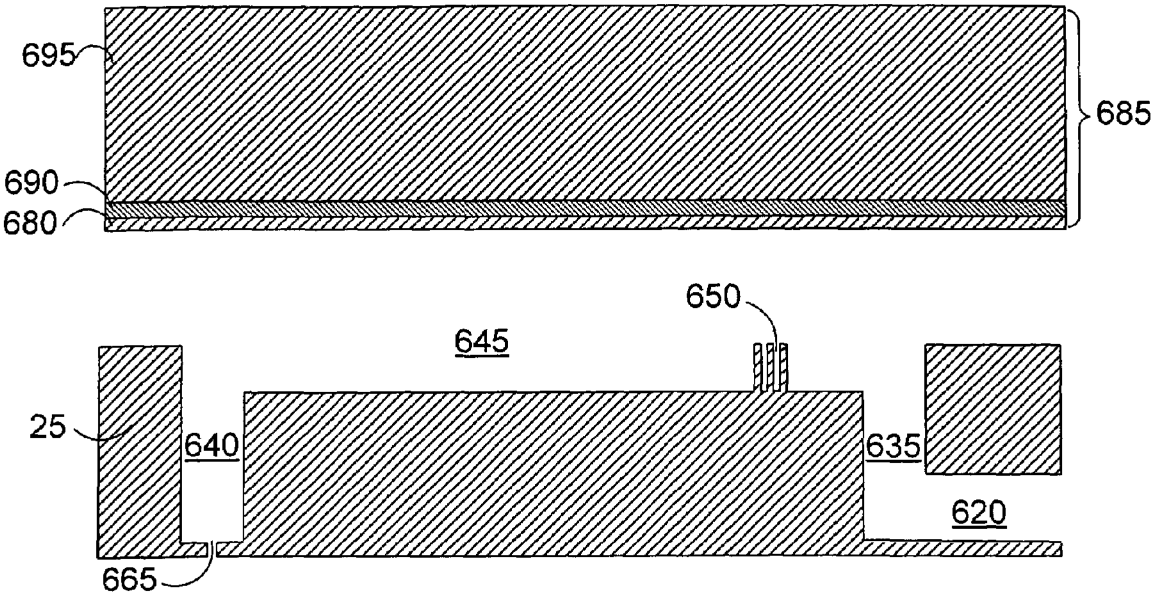
Figure 6L:
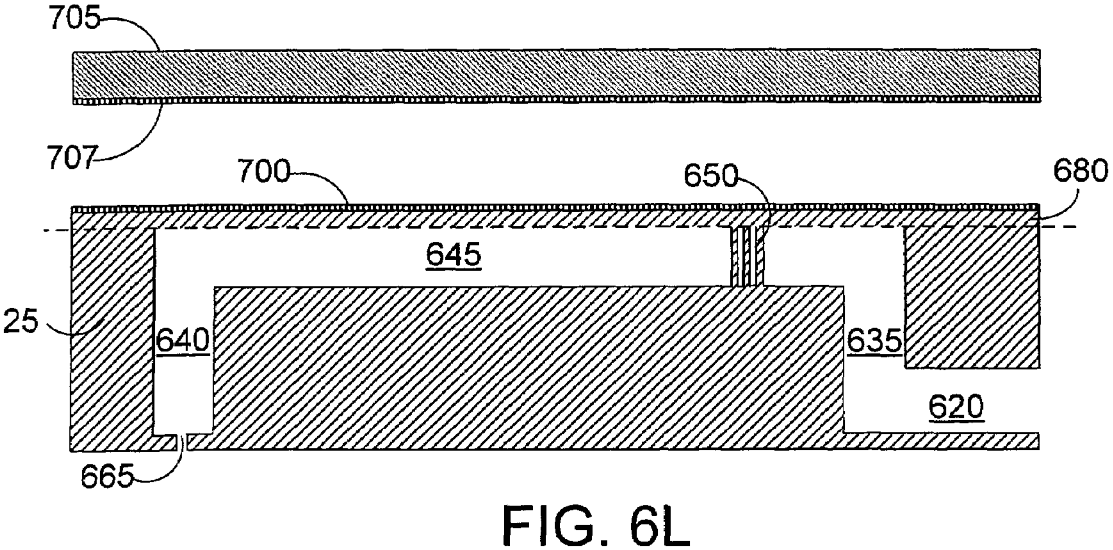
Figure 6M:
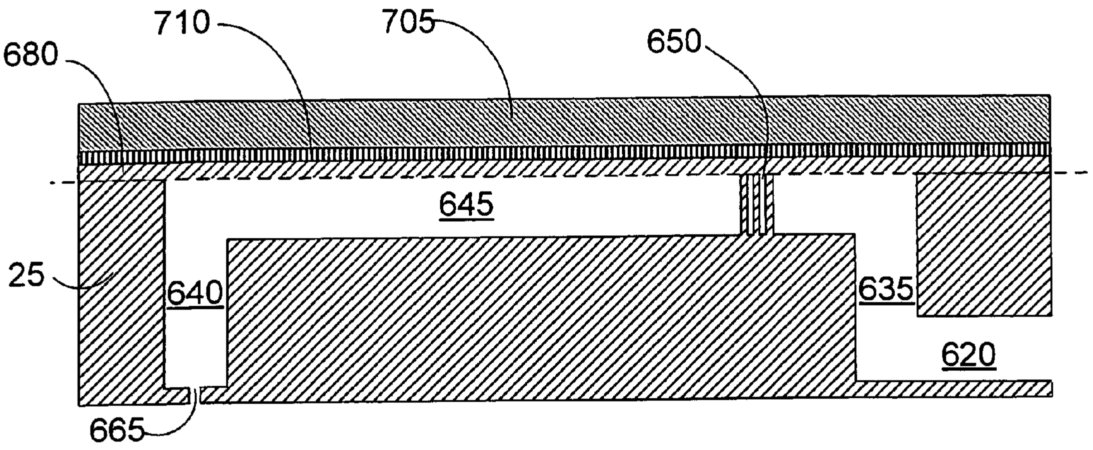
Figure 6N:
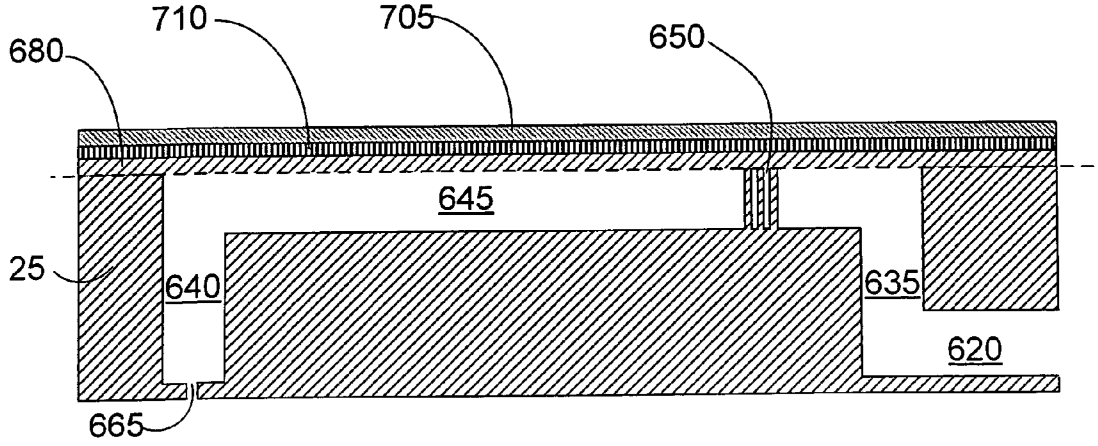
Figure 6O:
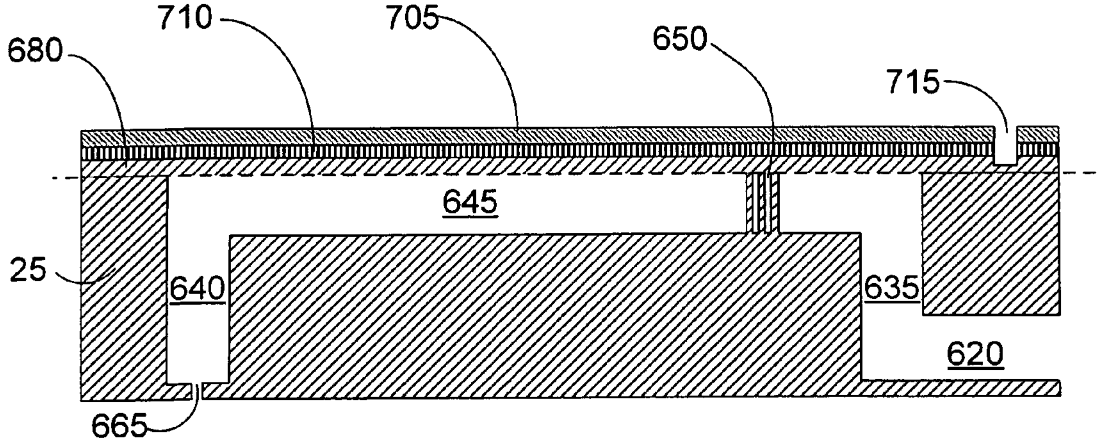
Figure 6P:
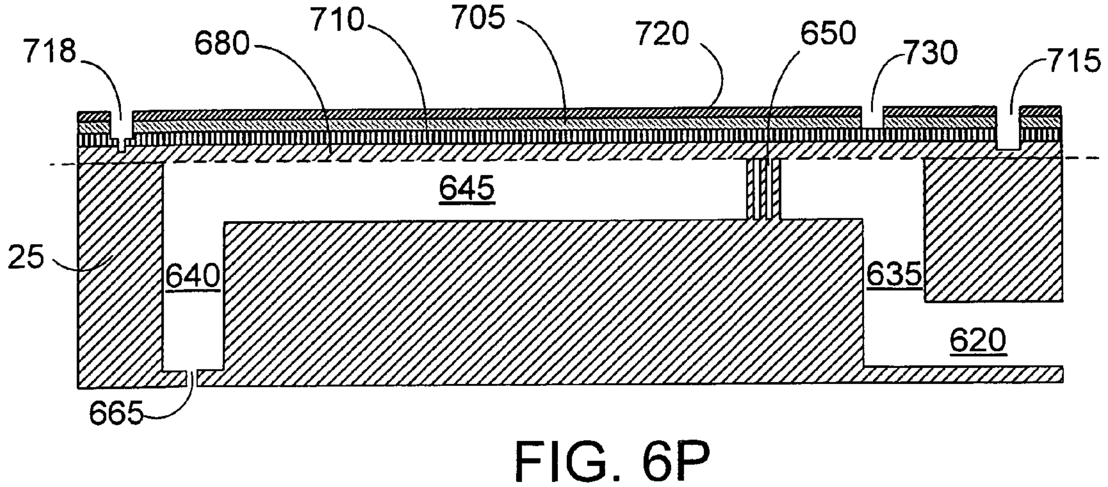

Referring to FIGS. 6A to 6P, the manufacture of a module including a substrate and a piezoelectric actuator is illustrated. A plurality of module substrates can be formed simultaneously on a substrate. For clarity, FIGS. 6A-6P illustrate a single flow path of a single module. The flow path features can be formed by etching processes.

Figure 7:
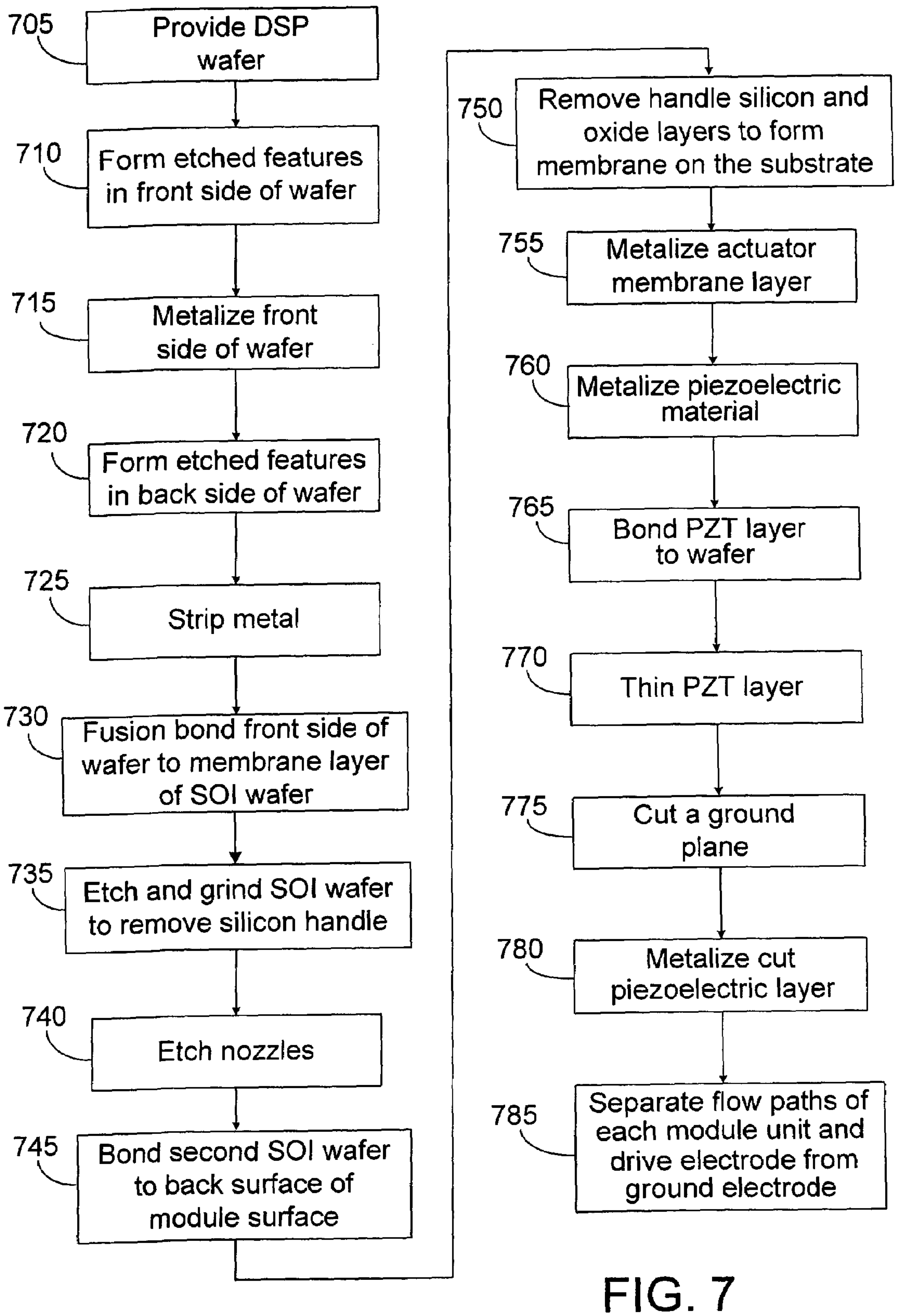
FIG. 7 is a flow diagram illustrating manufacture of a piezoelectric actuator and assembly of a module.

FIG. 7 provides a flowchart illustrating of the method of manufacture illustrated in FIGS. 6A to 6P.

Referring to FIG. 6A, a single double side polished (DSP) substrate 605, i.e., a substrate consisting essentially of silicon, is provided (step 705). The substrate 605 has a front side 610 and back side 615 where an ascender, a descender, impedance filter features, a module supply path and pumping chamber, or other etched features, of the module substrate will be formed. The DSP substrate 605 can have an oxide layer 603 on either or both sides (as shown in FIG. 6B). The substrate may be between 400 and 1000 microns thick, such as around 600 microns, or any thickness suitable for creating the printhead module. The DSP substrate 605 is used to form module substrate 25.

Referring to FIG. 6B, if etched features of the module flow path 55, are desired toward the front of the substrate, a photoresist 625 is deposited on the front side of the substrate 605. The photoresist 625 is patterned and the substrate 605 is etched to form a recess 620 that will provide the features of the flow path, such as the ink inlet 30 (step 710). The remaining photoresist 625 and oxide 603 are then removed. The reverse side of the substrate 605 can be protected, such as with tape or photoresist, while the oxide 603 is being removed.

As shown in FIG. 6C, the front surface 610 of the substrate is metallized (step 715), such as by vacuum depositing or sputtering with a metal, such as nickel, chromium, aluminum, copper, tungsten or iron to form a metal layer 630.

As shown in FIG. 6D, a photoresist layer 623 is disposed onto the back surface 615 of the silicon. The oxide layer 603 and the photoresist 623 are patterned to define the location of at least some of the etched features of the flow path. Then the substrate is etched from the back side, as shown in FIG. 6E (step 720). Multiple layers of patterning photoresist and etching can be used to create multilevel features. For example, etch can form channels 635 and 640, and recesses 645 and 650, which will provide the ascender 35, descender 40, pumping chamber 45, and impedance filter feature 50 when processing is complete.

An example of an etching process is isotropic dry etching by deep reactive ion etching, which utilizes plasma to selectively etch silicon to form features with substantially vertical sidewalls. A reactive ion etching technique known as the Bosch process is discussed in Laermor et al. U.S. Pat. No. 5,501,893, the entire contents of which is incorporated hereby by reference. Deep silicon reactive ion etching equipment is available from STS, Redwood City, Calif., Alcatel, Plano, Tex., or Unaxis, Switzerland and reactive ion etching can be conducted by, etching vendors including IMT, Santa Barbara, Calif. Deep reactive ion etching is used due to the ability to cut deep features of substantially constant diameter. Etching is performed in a vacuum chamber with plasma and gas, such as, $SF_6$ and $C_4F_8$. Because defects in the substrate can be caused by the heat created during the etching process, the back surface of the substrate is cooled. A cooling agent, such as helium, can be used to cool the substrate. The metal layer conducts the heat to the cooling agent efficiently, as well as prevents the cooling agent from escaping into the vacuum chamber and destroying the vacuum.

If an electrical insulator, such as, silicon dioxide, contacts the etched layer, charge can accumulate at the interface, resulting in an undercut of silicon at the interface of silicon and insulator. This undercut can trap air and disturb ink flow. When metal is used as an etch stop layer, the conductivity of the metal prevents charge from building at the interface of the silicon and the metal, thereby avoiding the problem of undercutting.

In addition or in the alternative to using a photoresist layer as an etch mask, a metal etch mask, e.g., an etch mask of nichrome, can be applied to the front side 610 of the DSP substrate 605. In this implementation, a metal layer can be formed on the DSP substrate 605, e.g., by vacuum depositing or sputtering before the photoresist layer is deposited. The photoresist layer is patterned and the metal layer can then be etched and patterned using the photoresist layer as a mask. The substrate 605 is then subjected to the etching step, e.g., the deep reactive ion etch described above, using the patterned metal layer as the mask. The photoresist layer may either be left on the metal layer in the substrate etching step or stripped before etching the substrate 605.

Although most etching processes are selective such that the etch rate of the photoresist is slower than that of the silicon, when a very deep etch is conducted using just the photoresist layer for the etch mask, the etching process can etch through the photoresist. In order to avoid this problem, multiple iterations of applying a photoresist, patterning the photoresist and etching are necessary before the features are the desired depth. However, metals are typically etched much more slowly than photoresists. Consequently, by using a metal layer as the etch mask, very deep features can be etched in a single etch step, thereby eliminating one or more process steps required for etching relatively deep, substantially uniformly cross-sectioned features.

Next, the metal layer 630 is stripped from the back of the substrate (and, if present, from the front of the substrate), such as by acid etching, as shown in FIG. 6F (step 725). After all of the features have been etched, a silicon layer can be bonded to the front side 615 of the module substrate 25.

Referring to FIG. 6G, silicon-to-silicon fusion bonding, or direct silicon bonding, is used to bond the front surface 610 of the etched silicon substrate to a silicon-on-insulator substrate 653 (step 730). A silicon-on-insulator substrate 653 includes a nozzle layer or device layer of silicon 655, an oxide layer 657 and a handle silicon layer 659, with the oxide layer 657 sandwiched between the nozzle layer 655 and the handle layer 659. The silicon-on-insulator substrate 653 can be formed by, growing the oxide layer 657 on a surface of a DSP substrate, and then forming the device layer 655 on the oxide layer 657. Specifically, to form the device layer 655, a second DSP substrate can be bonded to the oxide layer 657 and ground to a predetermined thickness. The grinding can be a multistep process. The first part of the grind process can be a bulk grind to remove material from the device layer 655. The bulk grind can be followed by a second finer grind step. An optional final polish can decrease surface roughness.

Fusion bonding, which creates Van der Waal's bonds between the two silicon surfaces, can occur when two flat, highly polished, clean silicon surfaces are brought together with no intermediate layer between the two silicon layers. To prepare the two elements for fusion bonding, the module substrate 25 and silicon-on-insulator substrate 653 are both cleaned, such as by reverse RCA cleaning. Any oxide on the module substrate 25 and the silicon-on-insulator substrate 653 can be removed with a buffered hydrofluoric acid etch (BOE). The module substrate 25 and silicon-on-insulator substrate 653 are then brought together and annealed at an annealing temperature, such as around 1050° C.-1100° C. An advantage of fusion bonding is that no an additional layer is formed between the module substrate 25 and the nozzle layer 655. After fusion bonding, the two silicon layers become one unitary layer such that no to virtually no delineation between the two layers exists bonding is complete. Therefore, the bonded assembly can be substantially free of an oxide layer inside of the assembly. The assembly can be substantially formed from silicon. Other methods of fusion bonding, such as hydrophobic substrate treatment, can be used to bond one silicon layer to a second silicon layer. After the fusion bonding, the remainder of the handle layer 659 is ground to remove a portion of the thickness, as shown in FIG. 6H. Etching is used to completely remove the handle layer 659 (step 735).

A resist 660 is provided on the front surface of the substrate, and the resist 660 and the oxide layer 657 are patterned, as shown in FIG. 61. The substrate is then etched, e.g., with deep reactive ion etching, to create a through passage to form the nozzle 665. The resist layer and any oxide layers are striped from the substrate, as shown in FIG. 6J (step 740).

In an alternative embodiment, a DSP substrate may be used instead of a silicon-on-insulator substrate to form the nozzle. If a second DSP substrate is used to form the nozzle 665, the second DSP substrate is bonded to the front side 610. The nozzles are then etched into the second DSP substrate. With either nozzle formation method, the length of the nozzle 665 is determined by the thickness of the silicon substrate in which the nozzle is etched. This allows for accurate definition of the nozzle flow path length. The shape of the nozzle can be cylindrical. In some embodiments, a portion of the flow path, such as the ink inlet 30, is open to the front of the module substrate 25. This opening can be etched concurrently with the nozzle 665.

As shown in FIG. 6K, a thin silicon layer 680 of a second silicon-on-insulator substrate 685 can be used to form the actuator membrane. The second silicon-on-insulator substrate 685 has a layer of buried oxide 690 sandwiched between a handle layer of silicon 695 and the membrane layer of silicon 680. The second silicon-on-insulator substrate can be bonded to the module substrate 25 with an adhesive or fusion bonding (step 745), as discussed above with respect to step 730. In one embodiment, hydrophilic fusion bonding bonds the silicon of the module substrate 25 with the membrane layer 680 of silicon of the silicon-on-insulator substrate 685.

Referring to FIG. 6L, once a silicon-on-insulator substrate 685 has been bonded onto the module substrate 25, the handle silicon layer 695 of the bonded silicon-on-insulator substrate 685 is removed, such as by grinding, etching or performing a bulk grinding step followed by etching the remaining silicon (step 750) (the dotted lines in the figures indicate where the membrane and chamber body are fused). If the handle 695 is etched, the oxide 690 layer of the silicon-on-insulator substrate acts as an etch stop layer. The oxide layer 690 remaining from the silicon-on-insulator can either be retained to float the electrode, or removed, for example, by reactive ion etching with $SF_6$ and $O_2$. The membrane 680 that remains from the silicon-on-insulator substrate 685 can be of any thickness, down to around 1 micron. The silicon layer 680 on a silicon-on-insulator layer tends to be uniform across the substrate, thus the thickness uniformity within an actuator membrane formed by bonding a silicon-on-insulator substrate to the chamber body is high. If a photoresist layer is included in the silicon-on-insulator substrate, such as between the oxide layer 690 and the membrane layer 680 or between the membrane layer 680 and the handle silicon layer 695, the handle silicon layer 695 can be removed by a technique that removes the photoresist, such as those used in lift-off methods instead of or along with etching and grinding. The remaining layer or layers of the silicon-on-insulator substrate 685 are then metallized, such as by vacuum depositing, to form metal layer 700 (step 755).

An alternative to fusion bonding the silicon-on-insulator substrate 685 to the module substrate 25 is bonding a thick silicon sheet to the module substrate and grinding the sheet to the desired thickness. However, grinding or polishing the sheet limits the minimum thickness of the membrane. Generally, a membrane less than 15 microns generally cannot be formed by grinding since such membranes cannot handle the mechanical force during grinding. In contrast, fusion bonding a silicon-on-insulator substrate 685 to the module substrate 25 allows a very thin membrane to be formed on the oxide and transferred to the module substrate 25. The silicon-on-insulator substrate 685 can be formed by growing the oxide layer 690 on the handle substrate of silicon 695. The device layer of silicon 680 can then be bonded to the oxide layer 690. Since the device layer of silicon 680 can then be polished or etched to the desired thickness. The handle layer of silicon 695 supports the device layer of silicon 680 while the thickness of the device layer of silicon 680 is reduced. Thus, the membrane layer 680 can be formed in almost any thickness desired, e.g., thinner than 15 microns, 10 microns, 5 microns or even thinner than 1 micron, and then bonded onto the substrate 25, thus permitting the resulting membrane 80 to be very thin. In one embodiment, the membrane is around 8 microns thick.

A piezoelectric material 705 is selected for building the piezoelectric actuator structure 100 on the module substrate 25. The density of the piezoelectric material 705 is about 7.5 g/cm3 or more, e.g., about 8 g/cm3 to 10 g/cm3. The d31 coefficient is about 200 or greater. HIPS-treated piezoelectric material 705 is available as H5C and H5D from Sumitomo Piezoelectric Materials, Japan. The H5C material exhibits an apparent density of about 8.05 g/cm3 and d31 of about 210. The H5D material exhibits an apparent density of about 8.15 g/cm3 and a d31 of about 300. Substrates are typically about 1 cm thick and can be diced to about 0.2 mm. The piezoelectric material 705 can be formed by techniques including pressing, doctor blading, green sheet, sol gel or deposition techniques. Piezoelectric material 705 manufacture is discussed in Piezoelectric Ceramics, B. Jaffe, Academic Press Limited, 1971, the entire contents of which are incorporated herein by reference. Forming methods, including hot pressing, are described at pages 258-9. High density, high piezoelectric constant materials, or lower performance material can be ground to provide thin layers and smooth, uniform surface morphology. Single crystal piezoelectric material such as lead-magnesium-niobate (PMN), available from TRS Ceramics, Philadelphia, Pa., can also be used.

These properties can be established in a piezoelectric material 705 by using techniques that involve firing the material prior to bonding the material to the actuator membrane. For example, piezoelectric material 705 that is molded and fired by itself (as opposed to on a support) has the advantage that high pressure can be used to pack the material 705 into a mold (heated or not). In addition, fewer additives, such as flow agents and binders, are typically required. Higher temperatures, 1200-1300° C. for example, can be used in the firing process, allowing better maturing and grain growth. Firing atmospheres (e.g. lead enriched atmospheres) can be used that reduce the loss of PbO (due to the high temperatures) from the ceramic. The outside surface of the molded part that may have PbO loss or other degradation can be cut off and discarded. The material can also be processed by hot isostatic pressing (HiPs), during which the ceramic is subject to high pressures, typically 1000-2000 atm. The Hipping process is typically conducted after a block of piezoelectric material has been fired, and is used to increase density, reduce voids, and increase piezoelectric constants.

The front of the piezoelectric material 705 is metallized, such as by vacuum depositing, e.g. sputtering, to form a metal layer 707 (step 760). Metals to deposit include copper, gold, tungsten, tin, indium-tin-oxide (ITO), titanium, platinum, or a combination of metals. In one embodiment, the metal layer 707 includes stacked layers of titanium-tungsten, gold-tin and gold. Similarly, the metal layer 700 may include stacked layers of titanium-tungsten and gold. The metallized surface 707 of the piezoelectric material is then bonded to the metal layer 700 on the silicon membrane 680 (step 765). The bonding can be achieved with a eutectic bond formed at about 305° C. and under 1000 N of force. The bonding forms a ground electrode 710, as shown in FIG. 6M. Alternatively, the PZT layer can be bonded to the module substrate 25 using an adhesive layer, for example an epoxy.

As shown in FIG. 6N, thin layers of pre-fired piezoelectric material 705 can be formed by reducing the thickness of a relatively thick substrate (step 770). A precision grinding technique, such as horizontal grinding, can produce a highly uniform thin layer having a smooth, low void surface morphology. In horizontal grinding, a workpiece is mounted on a rotating chuck having a reference surface machined to a high flatness tolerance. The exposed surface of the workpiece is contacted with a horizontal grinding wheel, also in alignment at high tolerance. The piezoelectric substrate may have a substantial thickness, for example, about 0.2 mm or more, which can be handled for initial surface grinding. The grinding can produce flatness and parallelism of, e.g., 0.25 microns or less, e.g. about 0.1 microns or less and surface finish to 5 nm Ra or less over a substrate. The grinding also produces a symmetrical surface finish and uniform residual stress. Where desired, slightly concave or convex surfaces can be formed. During grinding, the nozzle opening may be covered to seal the ink flow path from exposure to grinding coolant. The nozzle openings may be covered with tape.

A suitable precision grinding apparatus is Toshiba Model UHG-130C, available through Cieba Technologies, Chandler, Ariz. The substrate can be ground with a rough wheel followed by a fine wheel. A suitable rough and fine wheel have 1500 grit and 2000 grit synthetic diamond resinoid matrix, respectively. Suitable grinding wheels are available from Adoma or Ashai Diamond Industrial Corp. of Japan. The workpiece spindle is operated at 500 rpm and the grinding wheel spindle is operated at 1500 rpm. The x-axis feed rate is 10 microns/min for first 200-250 microns using the rough wheel and 1 micron/min for last 50-100 microns using the fine wheel. The coolant is 18 m W deionized water. The surface morphology can be measured with a Zygo model Newview 5000 interferometer with Metroview software, available from Zygo Corp, Middlefield, Conn.

In the alternative to bonding a pre-fired PZT layer to form the piezoelectric actuator structure 100 on the module substrate 25, a PZT layer can be formed using other layer formation techniques, including, but not limited to sputtering, e.g., RF sputtering, or sol gel. The PZT layer can be formed of the desired PZT layer thickness, or thicker and ground to obtain the required thickness, as described above.

As shown in FIG. 6O, a ground plane 715 can be cut, such as by sawing, through the piezoelectric layer 705, the ground electrode layer 710 and the silicon 680 of the module substrate 25 to expose the ground electrode layer 710 (step 775). The substrate is then cleaned.

Referring to FIG. 6P, the cut piezoelectric material is metallized, such as by vacuum depositing layers of titanium, tungsten, nickel and gold, copper, nickel chromium alloy, or other appropriate metal, onto the back of the piezoelectric layer 705 (step 780). The metal layer 720 on the piezoelectric material provides a metal contact to the ground layer 710 and provides as well a metal layer over the back surface of the actuator portion of the piezoelectric layer 705. Electrode separation cuts 730 are also made through the top metallization and partway through piezoelectric layer 705 to electrically separate the ground electrode 710 from the top metallization so that metal layer 720 forms a drive electrode. Isolation cut 718 is cut in the piezoelectric layer 705 between the flow paths to segregate the actuator structure 100 into the individual actuators 21 for the adjacent chambers (step 785). These cuts can be straight line saw cuts. Alternatively or in addition, kerfs can be formed by etching and then cuts can be made in the kerfs using a dicing saw. The modules can also be manually broken along the kerfs. The substrate is again cleaned.

For final assembly, the front surface of the module is attached to the faceplate, the flex circuit is attached to the back surface of the module, and the arrangement secured to the manifold frame.

The front face of the module may be provided with a protective coating and/or a coating that enhances or discourages ink wetting. The coating may be, e.g., a polymer such as Teflon or a metal such as gold or rhodium.

Use

The printhead modules can be used in any printing application, particularly high speed, high performance printing. The modules are particularly useful in wide format printing in which wide substrates are printed by long modules and/or multiple modules arranged in arrays.

Referring back to FIGS. 4A and 4B, the module substrate defines ink flow path 55. In this example, descender 40 directs ink flow orthogonally with respect to the upper and lower module substrate surfaces. The descender 40 has a relatively large volume and the nozzle 65 has a relatively small volume. The descender 40 directs ink from the pumping chamber 45 to the nozzle 65, where the ink is accelerated before it is ejected from the nozzle opening. The uniformity of the nozzle 65 across the module enhances the uniformity of the ink drop size and the ink drop velocity.

The actuator membrane 80 is typically an inert material and has compliance so that actuation of the piezoelectric layer causes flexure of the actuator membrane layer sufficient to pressurize ink in the pumping chamber. A voltage is applied across the ground and drive electrodes, causing the piezoelectric layer to flex. The piezoelectric layer exerts force on the membrane. The ink flows into the ink supply path, nozzle flow paths and nozzle opening onto the printing media.

The modules can be used in printers for offset printing replacement. The modules can be used to selectively deposit glossy clear coats applied to printed material or printing substrates. The printheads and modules can be used to dispense or deposit various fluids, including non-image forming fluids. For example, three-dimensional model pastes can be selectively deposited to build models. Biological samples may be deposited on an analysis array.

As will be obvious from the description, any of the described techniques can be combined with other techniques to achieve the goals of the specification. For example, any of the above techniques can be combined with the techniques and apparatus described in Printhead patent application Ser. No. 10/189,947, application date Jul. 3, 2002, the entire contents of which are incorporated herein by reference. In one embodiment, the piezoelectric actuator is fixed to the module substrate before the nozzle layer is bonded to the module substrate. Because the above method can reproducibly form a highly uniform membrane layer that is less than 15 microns, this method can be used in microelectromechanical devices other than printheads. For example, a highly uniform thin membrane can be used with a transducer. Still further embodiments are in the following claims.

A number of embodiments of the invention have been described. Nevertheless, it will be understood that various modifications may be made without departing from the spirit and scope of the invention. For example, in one implementation, the silicon body can be doped. Accordingly, other embodiments are within the scope of the following claims.

What is claimed is:

1. A microfabricated device, comprising:

a body of a first material, wherein the body has a plurality of recesses;

a membrane of the first material less than 15 microns thick bonded to the body such that the recesses in the body are at least partially covered by the membrane, the membrane varying in thickness by less than 1 micron across the membrane; and a piezoelectric structure formed on the membrane, where the piezoelectric structure includes a first conductive layer and a piezoelectric material.

2. The device of claim 1, wherein the body varies in thickness by less than 1 micron.

3. The device of claim 1, wherein an interface between the membrane and the body consists essentially of silicon.

4. The device of claim 1, wherein the recesses in the body provide one or more paths, each path having an inlet and an outlet to communicate with an exterior of the body.

5. The device of claim 4, wherein the one or more paths include one or more regions of varying depth.

6. The device of claim 5, wherein the outlet of each path is a nozzle.

7. The device of claim 6, wherein the nozzle is on an opposite side of the body from the membrane.

8. The device of claim 1, wherein the membrane is substantially free of openings.

9. The device of claim 8, wherein the recesses include a pumping chamber adjacent to the membrane.

10. The device of claim 9, wherein the piezoelectric structure includes a second conductive layer.

11. The device of claim 10, wherein the piezoelectric material is between the first and second conductive layers.

12. The device of claim 9, wherein the membrane is less than 10 microns thick.

13. The device of claim 12, wherein the membrane is less than 5 microns thick.

14. The device of claim 13, wherein the membrane is less than 1 micron thick.

15. The device of claim 1, wherein a portion of the membrane directly adjacent to the body and a portion of the body directly adjacent to the membrane are substantially free of oxide and the membrane directly contacts the body.

* * * * *